(12) United States Patent
Bnayahu et al.

(10) Patent No.: US 8,954,936 B2
(45) Date of Patent: Feb. 10, 2015

(54) ENHANCING FUNCTIONAL TESTS COVERAGE USING TRACEABILITY AND STATIC ANALYSIS

(71) Applicant: International Business Machines Corporation, Armonk, NY (US)

(72) Inventors: Jonathan Bnayahu, Haifa (IL); Maayan Goldstein, Haifa (IL); Dany Moshkovich, Haifa (IL); Mordechai Nisenson, Haifa (IL); Yahalomit Simionovici, Haifa (IL); Shmuel Or, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 13/674,063

(22) Filed: Nov. 11, 2012

(65) Prior Publication Data

US 2013/0067436 A1 Mar. 14, 2013

Related U.S. Application Data

(63) Continuation of application No. 12/768,764, filed on Apr. 28, 2010, now abandoned.

(51) Int. Cl.
*G06F 9/44* (2006.01)
*G06F 11/36* (2006.01)

(52) U.S. Cl.
CPC .............. G06F 11/3676 (2013.01); G06F 8/10 (2013.01); *G06F 8/75* (2013.01); *G06F 8/73* (2013.01); *G06F 8/20* (2013.01)
USPC ............ 717/132; 717/131; 717/133; 717/128

(58) Field of Classification Search
CPC .............. G06F 8/73; G06F 8/71; G06F 8/75; G06F 8/10; G06F 8/20; G06F 11/3676
See application file for complete search history.

(56) References Cited

U.S. PATENT DOCUMENTS 6,725,399 B1 4/2004 Bowman
7,299,458 B2 * 11/2007 Hammes ....................... 717/133

(Continued)

FOREIGN PATENT DOCUMENTS

WO 2005045673 5/2005

OTHER PUBLICATIONS

Raimondas Lecevicius, Tracing Execution of Software for Design Coverage, 2001, pp. 1-11.*
Erwan Jahier, Generic Program Monitoring by Trace Analysis, 2001, pp. 3-18.*
Taweesup Apiwattanapong, Efficient and Precise Dynamic Impact Analysis Using Execute-After Sequences, 2005, pp. 1-8.*

(Continued)

*Primary Examiner* — Thuy Dao
*Assistant Examiner* — Mongbao Nguyen

(57) ABSTRACT

A method that may include: building a dependencies graph representing dependencies between code elements of a computer code; associating portions of the computer code with corresponding design specifications or requirements derived from a design specifications document or a requirements document respectively which is associated with the computer code, to yield a design specifications or requirements-code tracing map; and analyzing the design specifications or requirements-code tracing map based on the dependencies graph to yield an ordered list of design specifications or requirements respectively, wherein the order is selected such that functional tests written for the computer code and addressing design specifications or requirements of a higher order, will yield a higher level of functional test coverage of the computer code in terms of design specifications or requirements.

6 Claims, 6 Drawing Sheets

(56) References Cited

U.S. PATENT DOCUMENTS

| | | | |
|---|---|---|---|
| 7,600,221 B1* | 10/2009 | Rangachari | 717/128 |
| 8,042,098 B2* | 10/2011 | Do et al. | 717/123 |
| 8,347,272 B2* | 1/2013 | Sugawara et al. | 717/133 |
| 8,806,450 B1* | 8/2014 | Maharana et al. | 717/133 |
| 2001/0010091 A1 | 7/2001 | Noy | |
| 2004/0123272 A1 | 6/2004 | Bailey et al. | |
| 2006/0143596 A1* | 6/2006 | Miyashita et al. | 717/131 |
| 2006/0168566 A1* | 7/2006 | Grimaldi | 717/123 |
| 2006/0225049 A1* | 10/2006 | Lv et al. | 717/128 |
| 2006/0277439 A1* | 12/2006 | Davia et al. | 714/38 |
| 2008/0098349 A1 | 4/2008 | Lin et al. | |
| 2009/0019427 A1 | 1/2009 | Li et al. | |
| 2009/0287729 A1* | 11/2009 | Chen et al. | 707/102 |
| 2009/0313607 A1* | 12/2009 | Harding et al. | 717/125 |
| 2010/0005455 A1* | 1/2010 | Gyure et al. | 717/128 |
| 2010/0037209 A1* | 2/2010 | Sasaki | 717/123 |
| 2010/0100874 A1* | 4/2010 | Narayanan et al. | 717/131 |
| 2010/0122238 A1* | 5/2010 | Kannan et al. | 717/123 |
| 2010/0242028 A1* | 9/2010 | Weigert | 717/131 |
| 2011/0145788 A1* | 6/2011 | Xu et al. | 717/121 |

OTHER PUBLICATIONS

Steve Cornett, "Code Coverage Analysis", Bullseye Testing Technology 1996-2008. URL: http://www.bullseye.com/coverage.html.

Lormans et al, "Reconstructing Requirements Coverage Views from Design and Test using Traceability Recovery via LSI", Proceeding TEFSE '05 Proceedings of the 3rd international workshop on Traceability in emerging forms of software engineering, pp. 37-42, 2005.

Technobuff, "Requirement Coverage—Another dimension to Unit Testing", Downloaded on Sep. 23, 2012. URL: http://www.technobuff.net/webapp/product/showTutorial.do?name=jrequire&tssar.

Steve Cornett, "Code Coverage Analysis", Bullseye Testing Technology 1996-2008, Sep. 15, 2012 URL: http://www.bullseye.com/coverage.html.

Karen N. Johnson, "Is functional testing sufficient to determine code coverage?", searchsoftwarequality, techtarget, Sep. 16, 2012. URL: http://searchsoftwarequality.techtarget.com/expert/KnowledgebaseAnswer/0,289625,sid92_gci1350915_mem1,00.html.

* cited by examiner

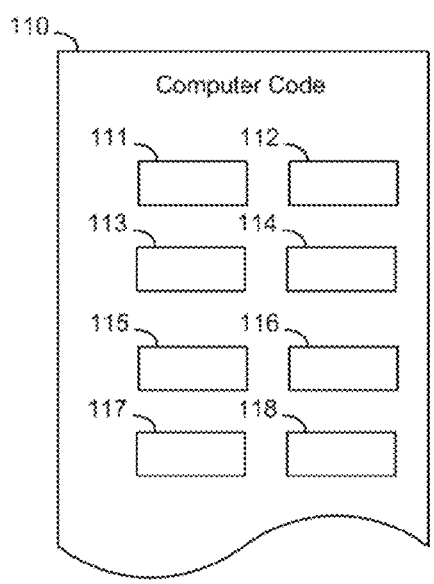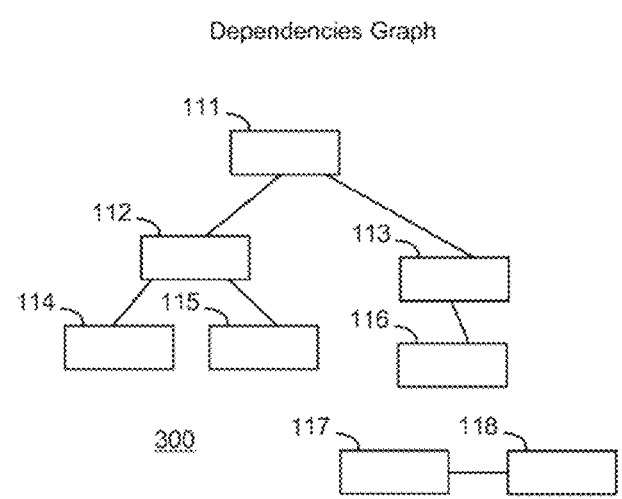
Figure 3A
Figure 3B

ENHANCING FUNCTIONAL TESTS COVERAGE USING TRACEABILITY AND STATIC ANALYSIS

CROSS-REFERENCE TO RELATED APPLICATION

This application is a continuation application of U.S. patent application Ser. No. 12/768,764 entitled, "ENHANCING FUNCTIONAL TESTS COVERAGE USING TRACEABILITY AND STATIC ANALYSIS", filed on Apr. 28, 2010 and is assigned to the same assignee in the present application, contents of which are incorporated by reference herein in its entirety.

BACKGROUND

1. Technical Field

The present invention relates to computer code testing and more particularly, to improving functional test coverage for a given computer code.

2. Discussion of the Related Art

Functional tests are used throughout the life cycle of computer code development in order to verify that the computer code being developed meets the functional requirements or the design according to which the computer code has been written. The functional requirements are usually set forth in a specification document, possibly written in a natural language by the client. A design is then written, also in a natural language by a computer system engineer. The design specifications contain high level description, in computer system terms, detailing how to address the requirements.

An important quantitative parameter in the code testing domain is the coverage of the design specifications or requirements. The design specifications or requirements coverage usually relates to the amount of the code that a given set of tests covers in terms of the design specifications or the requirements according to which, the code has been written. Existing solutions for assessing the aforementioned coverage require explicit mapping between the design specifications or requirements and the tests, either directly or indirectly in accordance with a specified model. Currently, there are no known methods to achieve such a coverage assessment without an explicit link between the design specifications or requirements and the tests. In addition, an assessment of the coverage associated with each design specifications or requirements may be advantageous in developing new functional tests for a given code in order to improve the code coverage.

BRIEF SUMMARY

One aspect of the invention provides a method that may include the following steps: building a dependencies graph representing dependencies between code elements of a computer code; associating portions of the computer code with corresponding design specifications or requirements derived from a design document or a requirements document respectively which is associated with the computer code, to yield a design specifications or requirements-code tracing map; and analyzing the design specifications or requirements-code tracing map based at least partially on the dependencies graph to yield an ordered list of design specifications or requirements respectively, wherein the order is selected such that functional tests written for the computer code and addressing design specifications or requirements of a higher order, will yield a higher level of functional test coverage of the computer code in terms of design specifications or requirements, wherein at least one of the building, the associating, and the analyzing is executed by at least one processor, and wherein the ordered list is useable to generate functional tests for enhancing code coverage.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A and 3B show a block diagram and a graph diagram respectively illustrating an aspect according to some embodiments of the invention;

Figure 1:
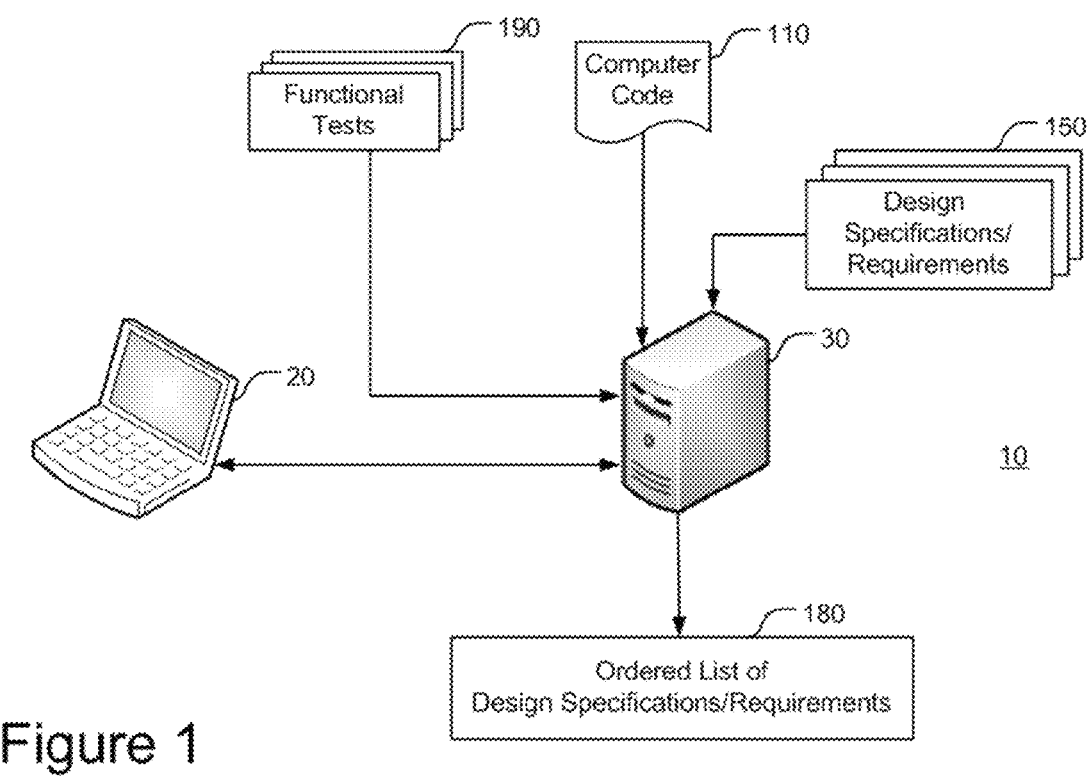
FIG. 1 is a high level schematic block diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "requirement" or "functional requirement" as used herein in this application refers to a requirement that defines a function of a software system or its component. A function is described as a set of inputs, the behavior, and outputs. Functional requirements may be calculations, technical details, data manipulation and processing and other specific functionality that define what a system is supposed to accomplish. Behavioral requirements describing all the cases where the system uses the functional requirements are captured in use cases. Functional requirements are supported by non-functional requirements (also known as quality requirements), which impose constraints on the design or implementation.

The term "design specifications" as used herein in this application refers to a high level description, usually in computer system terms, detailing how to address the requirements. This document, usually written in natural language is usually written by a computer system engineer after reading the requirements document.

The term "system testing" as used herein in this application refers to testing conducted on a complete, integrated system to evaluate the system's compliance with its specified requirements. System testing falls within the scope of black box testing, and as such, should require no knowledge of the inner design of the code or logic.

The term "test coverage" or simply, "coverage" as used herein in this application refers to a measure used in system testing. It describes the degree to which the source code of a program has been tested. It is a form of testing that inspects the code directly and is therefore a form of white box testing.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an exemplary environment of a system according to some embodiments of the invention. According to the exemplary embodiment, computer network 10 may include a personal computer 20 connected to a server 30. It is understood however, that any type of computer may be used instead of server 30. Server 30 may be in operative association with computer code 110 and design specifications or requirements document 150. In addition, server 30 may be in communication with functional tests 195.

In operation, computer code 110, design specifications or requirements 150, and tests from functional tests 195 may be used by server 30 to generate an ordered list of design specifications or requirements in which the order of the design specifications or the requirements is determined such that design specifications or requirements that are least covered by the tests, and have the higher level of code element associated with them directly or indirectly, will have a higher order of the ordered list of design specifications or requirements.

Figure 2:
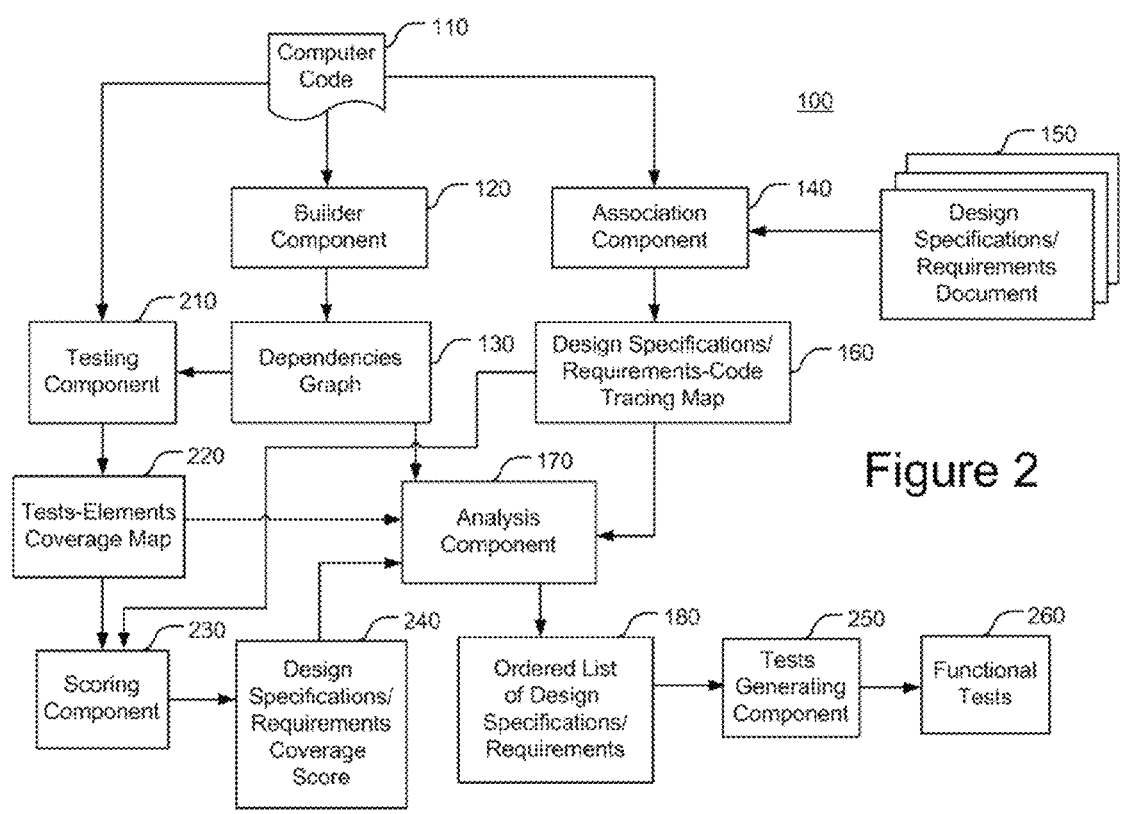
FIG. 2 is a high level schematic block diagram illustrating a system according to some embodiments of the invention.

FIG. 2 is a high level schematic block diagram illustrating system 100 according to some embodiments of the invention. System 100 may include a builder component 120 configured to build a dependencies graph 130 representing dependencies between code elements of a computer code 110. System 100 may further include an association component 140 configured to associate portions of computer code 110 with corresponding design specifications or requirements derived from a design document or a requirements document 150 respectively. Computer code 110 has been written based on the design specifications or requirements. The associating of association component 140 may yield a design specifications or requirements-code tracing map 160.

System 100 may further include an analyzing component 170 configured to analyze design specifications or requirements-code tracing map 160 based on dependencies graph 130 to yield an ordered list 180 of design specifications or requirements respectively, wherein the order in the list is selected such that functional tests written for the computer code and addressing design specifications or requirements of a higher order, will yield a higher level of functional test coverage of computer code 110 in terms of design specifications or requirements. Optionally, analyzing component 170 may be imputed directly with dependencies graph 130.

FIGS. 3A and 3B show a block diagram and a graph diagram respectively illustrating an aspect according to some embodiments of the invention. In FIG. 3A, computer code 110 is shown, containing testable code elements (functions and/or classes) 111-118. FIG. 3B shows a respective graph 300 that shows the dependencies between code elements 111-118. These dependencies may be any form of logical/control flow relationship. For example, a dependent coded element is a code element that another code element may use, access, invoke, and the like.

Returning now to FIG. 2, system 100 may further include a testing component 210 configured to run a set of functional tests over computer code 110 and determine, based at least partially on graph 130, for each code element and code element that depends on it, which functional test covered it, to yield a tests-elements coverage map 220. In addition, analyzing component 170 may be further configured to use tests-elements coverage map 220 in the process of generating ordered list 180. Alternatively, the dependency graph may be used by analyzing component 170 independently of the tests, in order to determine which code elements are related to which requirements or design specifications. In other words, the dependency graph is utilized in conjunction with the traceability techniques in order to achieve a more comprehensive mapping of code elements and design specifications or requirements.

According to some embodiments, system 100 may further include a scoring component 230 configured to apply a scoring function to design specifications or requirements-code tracing map 160 and the tests-elements coverage map 220, to yield a design specifications or requirements-coverage score 240 for each design portion or requirement, representing a level of code coverage by the functional tests, in design or requirement terms. Additionally, design specifications or requirements presenting lower design specifications or requirements-coverage score 240 are assigned by analyzing component 170 with a higher order in ordered list 180.

According to some embodiments, design specifications or requirements which present substantially a common score are reordered by analyzing component 170 in ordered list 180 according to the number of code elements and dependent code elements each design/requirement are addressing in their corresponding functional tests.

According to some embodiments, system 100 may further include a test generating component 250 configured to generate functional tests 260 based on the design specifications or requirements in the ordered list and their respective order. Functional tests 260 may be generated automatically by a tests generator, semi-automatically using a wizard, or manually, by a system engineer using ordered list 180 as guidelines for developing new tests.

Figure 4:
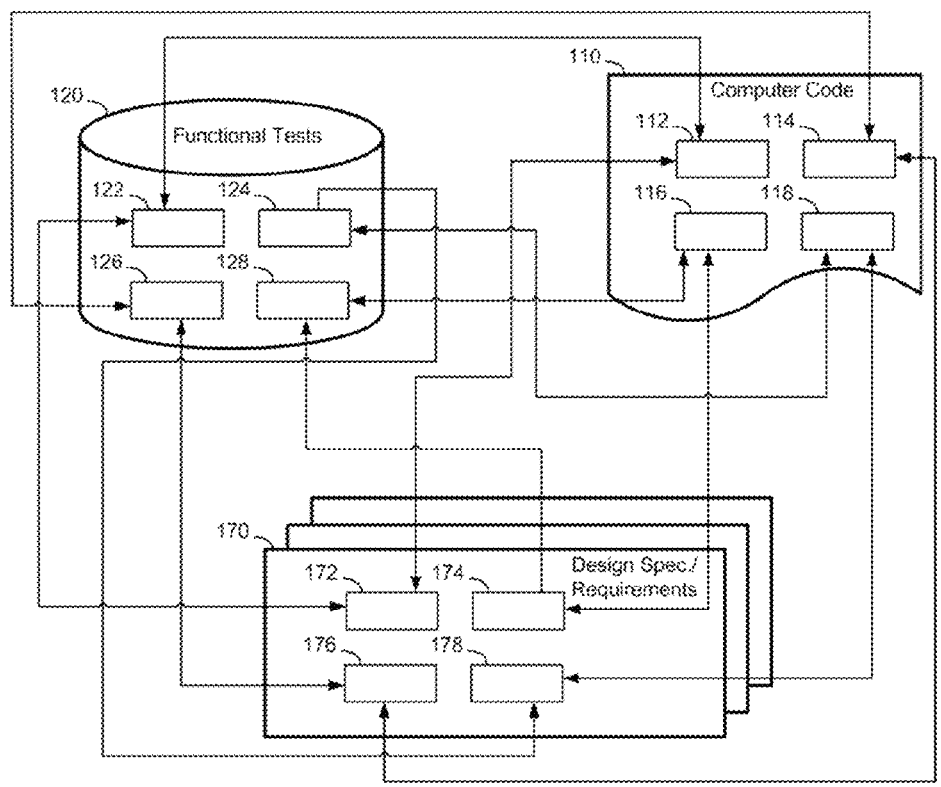
FIG. 4 shows a high level schematic block diagram illustrating an aspect according to some embodiments of the invention.

FIG. 4 shows a high level schematic block diagram illustrating an aspect according to some embodiments of the invention. Specifically, it shows the relationship between code, tests and design specifications or requirements. Computer code 110 contains code elements (functions and/or classes) 112, 114, 116, and 118 is in operative association with functional tests 195 which include tests 122, 124, 126, and 128, and further in operative association with design specifications or requirements documents 170 containing design specifications or requirements 172, 174, 176, and 178. The diagram illustrates how each code element may be traced back to a respective design specification or requirement, in addition, how each code element may be associated with a respective test, and finally how the tracing and the association yield a mapping of tests to design specifications or requirements. For example, code element 112 may determined to be tested by test 122. In addition, same code element 112 may be traced back to design specification or requirement 172. Thus, in embodiments of the aforementioned method, test 122 may be mapped into design specification/requirement 172. In embodiments of the invention, test-code element coverage map 140 and design specifications or requirements-code coverage map 160 may be in the form of tables or any other form of data structure that enables a description of bi-directional connection of pairs.

Figure 5:
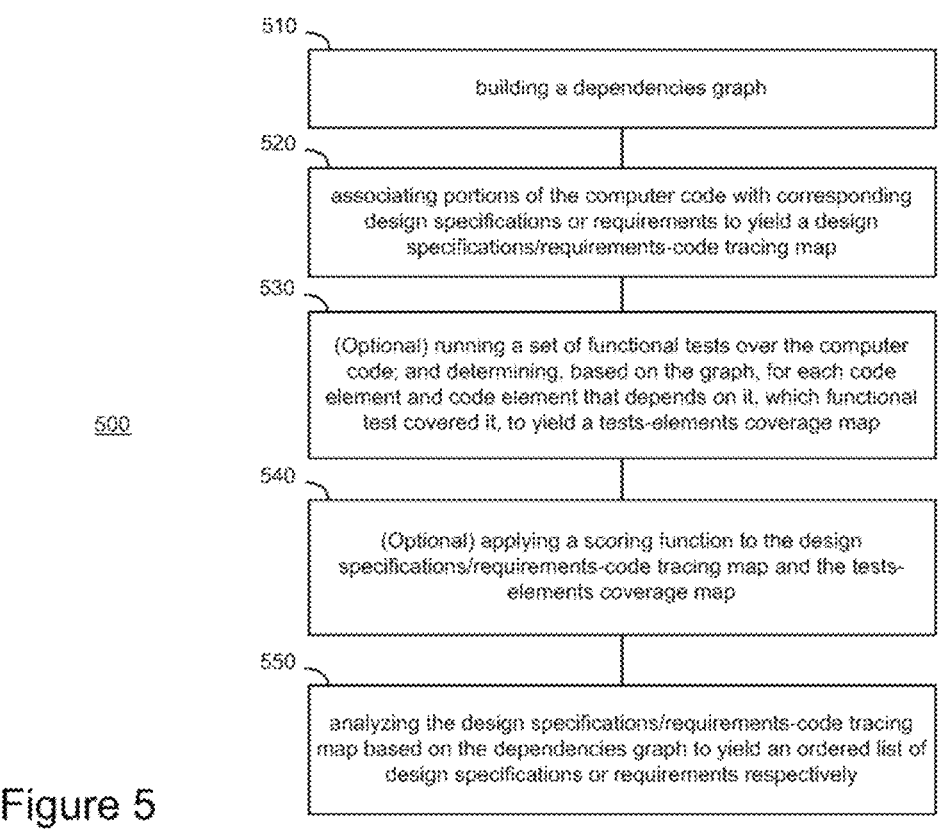
FIG. 5 is a high level flowchart diagram illustrating a method according to some embodiments of the invention.

FIG. 5 is a high level flowchart diagram illustrating a method 500 according to some embodiments of the invention. The method may include the following steps: building a dependencies graph representing dependencies between code elements of a computer code 510; associating portions of the computer code with corresponding design specifications or requirements derived from a design specifications document or a requirements document respectively which is associated with the computer code, to yield a design specifications or requirements-code tracing map 520; and analyzing the design specifications or requirements-code tracing map based on the dependencies graph to yield an ordered list of design specifications or requirements respectively, wherein the order is selected such that functional tests written for the computer code and addressing design specifications or requirements of a higher order, will yield a higher level of functional test coverage of the computer code in terms of design specifications or requirements 550.

In order to implement the aforementioned method, a computer (not shown) may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

According to some embodiments of the invention, method 500 may further include the steps of: running a set of functional tests over the computer code; and determining, based on the graph, for each code element and code element that depends on it, which functional test covered it, to yield a tests-elements coverage map 530, wherein in the analyzing, the tests-elements coverage map is further used to yield the ordered list.

According to some embodiments of the invention, method 500 may further include the step of applying a scoring function 540 to the design specifications or requirements-code tracing map and the tests-elements coverage map, to yield a design specifications or requirements-coverage score for each design portion or requirement, representing a level of code coverage by the functional tests, in design or requirement terms, wherein design or requirements presenting lower design specifications or requirements-coverage score are assigned with a higher order in the ordered list.

The following is a non-limiting example implementing the aforementioned scoring process. The scoring may include the following steps: initializing the coverage score for each design specification/requirement by $r_i=0$, for each i. Then, for each design specification/requirement retrieved, counting the number of links pointing to this design specification/requirement, $c_i$. Then, calculating the coverage score for a design specification/requirement using a normalization of the number of links pointing to that design specification/requirement, for example: $r_i=c_i/\Sigma\{c_j\}$. Finally, the output of the scoring function may show the design specifications or requirements coverage scores $\{r_i\}$.

According to some embodiments of the invention, the computer code has been generated, either by a human developer, automatically, or semi-automatically in order to meet the design specifications or requirements. At least some of the elements of the code that are the subject of the functional tests are functions and at least some of the tested elements are classes. The design specifications or requirements, in turn are usually written in a natural language, possibly by a system engineer.

Figure 6:
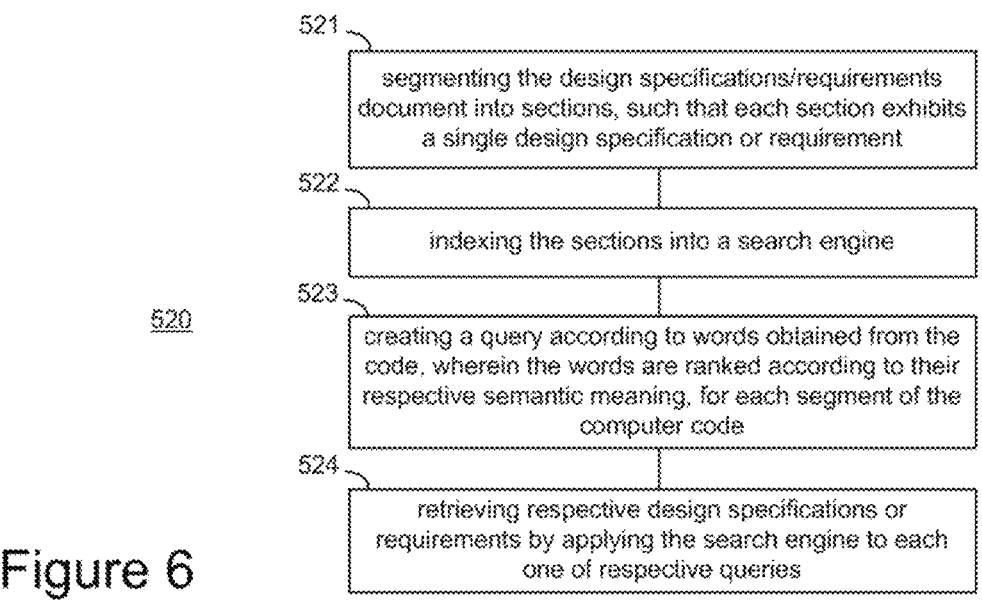
FIG. 6 is a high level flowchart diagram illustrating an aspect relating to the method according to some embodiments of the invention.

FIG. 6 is a high level flowchart diagram illustrating an aspect relating to method 500 according to some embodiments of the invention. The aforementioned step of associating 520 may further include the following steps: segmenting the design or the requirements document into sections, each section having a single design specification or a single requirement 521; indexing the sections into a search engine 522; creating a query according to words obtained from the code, wherein the words are ranked according to their respective semantic meaning, for each segment of the computer code 523; and retrieving respective requirements or design specifications by applying the search engine to each one of respective queries 524.

The following is a more detailed embodiment of the traceability process. The traceability process starts with segmentation of the design requirements document into sections, wherein each section comprises a single design portion or requirement. The segmentation may be followed by pre-processing each section using various techniques. Non-limiting examples of such techniques may include filter stop words (frequent words) and stemming. After pre-processing an indexing of all design specifications or requirements segments into a search engine is performed. Then, given a code segment, the following process is performed in order to find the design specification(s)/requirement(s) from which that section follows from: first, the given code is preprocessed using a pre-processing technique such as the aforementioned techniques. Then, words concatenated, for example, by CamelCase or underlines are separated. Subsequently, a query is created from the code. For example, for a Java class the following information may be used as words in creating the query: class name, public function names, class comments, public function arguments and return types, super class names and implemented interfaces, and public function comments. Then words are being ranked according to the semantic meaning of their respective source. Thus for example, a class name will be ranked higher than a comment. Finally, the query is being entered into the search engine to retrieve the related design specifications or requirements.

According to some embodiments of the invention, another sub process is provided for improving the precision of the coverage score of functions. This may be achieved by generating a wider query which combines terms from both the tested elements and the elements that the tested elements depend on according to the dependencies graph.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
   building a dependencies graph representing dependencies between a plurality of code elements of a computer code;
   calculating a plurality of links associating portions of the computer code in the dependencies graph with corresponding design specifications or requirements written in a natural language derived from a word analysis of a plurality of sections in a design document or a requirements document, associated with the computer code and addressed by a plurality of functional tests, to yield a design specifications or requirements-code tracing map, wherein the associating comprises:
      segmenting the design or the requirements document into said plurality of sections, each section of said plurality of sections having a single design portion or a single requirement of the corresponding design specifications or requirements;
      indexing the plurality of sections into a search engine;
      creating a query according to words obtained from the computer code, wherein the words are ranked according to their respective semantic meaning, for each segment of the computer code; and
      retrieving respective requirements or design specifications by applying the search engine to each one of respective queries; and
   analyzing the design specifications or requirements-code tracing map based at least partially on the dependencies graph to yield an ordered list of the design specifications or requirements based on an analysis of said plurality of links, wherein the order in said ordered list is selected such that at least some of said plurality of functional tests, which are written for the computer code and addressing design specifications or requirements of a higher order, yield a higher level of functional test coverage of the computer code in terms of design specifications or requirements,
   wherein at least one of the building, the calculating, and the analyzing is executed by at least one processor.

2. The method according to claim 1, further comprising generating said plurality of functional tests based on the design specifications or requirements in the ordered list and their respective order.

3. The method according to claim 1, further comprising:
   running a set of functional tests from said plurality of functional tests over the computer code;
   determining, based on the graph, for each code element and code element that depends on it, which functional test covered it, to yield a tests-elements coverage map,
   wherein in the analyzing, the tests-elements coverage map is further used to yield the ordered list.

4. The method according to claim 3, further comprising applying a scoring function to the design specifications or requirements-code tracing map and the tests-elements coverage map, to yield a design specifications or requirements-coverage score for each design portion or requirement, representing a level of code coverage by the functional tests, in design or requirement terms, wherein design or requirements presenting lower design specifications or requirements-coverage score are assigned with a higher order in the ordered list.

5. The method according to claim 4, wherein design specifications or requirements presenting substantially a common score are reordered in the ordered list according to a number of code elements and dependent code elements each design/requirement are addressing in their corresponding functional tests.

6. The method according to claim 4, further comprising generating functional tests based on the order of the ordered list of design specifications or requirements.

* * * * *